United States Patent
Yasutomi

(10) Patent No.: US 6,751,031 B2
(45) Date of Patent: Jun. 15, 2004

(54) LENS BARREL CAPABLE OF POSITIONING LENS FRAMES WITH HIGH PRECISION

(75) Inventor: Satoru Yasutomi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/236,039

(22) Filed: Sep. 5, 2002

(65) Prior Publication Data

US 2003/0072089 A1 Apr. 17, 2003

(30) Foreign Application Priority Data

Sep. 6, 2001 (JP) .................................. 2001-270874

(51) Int. Cl.⁷ ................................................ G02B 7/02
(52) U.S. Cl. ...................... 359/819; 359/826; 359/691; 359/699
(58) Field of Search ................................ 359/691, 694, 359/695, 699–701, 703–705, 819, 826, 821–823, 829

(56) References Cited

U.S. PATENT DOCUMENTS 6,026,245 A * 2/2000 Fujii et al. ..................... 396/85
6,198,578 B1 * 3/2001 Iwasa et al. ................. 359/699
2001/0005287 A1 * 6/2001 Hayashi et al. ............. 359/823
2001/0017738 A1 * 8/2001 Nomura et al. ............. 359/700

FOREIGN PATENT DOCUMENTS

JP           11-064714 A           3/1999

* cited by examiner

Primary Examiner—Jordan M. Schwartz
Assistant Examiner—Jessica T Stultz
(74) Attorney, Agent, or Firm—Frishauf, Holtz, Goodman & Chick, P.C.

(57) ABSTRACT

A lens barrel includes a first frame member supporting a first lens group, a second frame member supporting a second lens group and being capable of movable relative to the first frame member along an optical axis, a cam follower in the first frame member, a cam frame member having a cam groove engaged with the cam follower to permit the first frame member to be movable along the optical axis, a contact portion which is provided for the second frame member and can come into contact with the cam follower, and a pushing member pushing the second frame member in the direction the cam follower comes into contact with the contact portion. The pushing member pushes the second frame member and the contact portion comes into contact with the cam follower. Thus, the position of the second lens group with respect to the first lens group can be restricted.

18 Claims, 9 Drawing Sheets

LENS BARREL CAPABLE OF POSITIONING LENS FRAMES WITH HIGH PRECISION

This application claims the benefit of Japanese Application No. 2001-270874 filed in Japan on Sep. 6, 2001, the entire contents of which are incorporated herein by reference.

BACKGROUND OF THE INVENTION

1. Field of the Invention

The present invention relates to a lens barrel of a camera constructed so that a plurality of lens frames each having a photographic lens group are movable along an optical axis.

2. Related Art Statement

In recent years, in widespread compact zoom cameras, a zoom lens barrel advances and retracts so as to cover a photographic range from a wide angle position to a telephoto position. Such a zoom lens barrel has been put into practical use. In order to become more compact in size while being carried, the zoom lens barrel can move from a photographic position such as the wide angle position or the telephoto position to a collapsing position in which the zoom lens barrel is received in a camera body.

Furthermore, in recent years, higher zoom magnification is desired. Accordingly, a difference between the length of the lens barrel at the wide angle position or the collapsing position and the length of the lens barrel at the telephoto position becomes larger. In order to cope with this situation, serving as the structure of a lens frame assembly which can extend longer, a zoom lens barrel composed of many lens frames, namely, having a multistage lens frame structure is needed.

In this kind of zoom lens barrel, generally, a plurality of lens frames holding photographic lens groups are independently movable along an optical axis. Serving as a zoom lens barrel having such a multistage lens frame structure, for example, there is a four-stage zoom lens barrel instructed by combining two single annular frames with a double frame with a double structure including a frame member having a cam or a helicoid and a straight frame having a straight guide.

The zoom lens barrel comprises a first-stage stationary frame fixed to and held by a camera body, a second-stage rotary frame and a movable frame in the rotary frame, a third-stage cam frame and a float key in the cam frame, and a fourth-stage first lens frame. The zoom lens barrel further comprises a second lens frame and a third lens frame which are received in the cam frame, and an advancing gear.

The first lens frame, the second lens frame, and the third lens frame hold a first lens group, a second lens group, and a third lens group along an optical axis of a lens of the present lens barrel, respectively. Each lens group comprises a plurality of photographic lenses.

In the zoom lens barrel having the above configuration, a rotating force is transmitted from the advancing gear to the rotary frame, which is rotatably held in the stationary frame. Thus, the movable frame is first advanced relative to the rotary frame. Then, the cam frame, which is engaged with a through cam of the movable frame and the straight groove of the rotary frame, is also advanced. Consequently, the first lens frame which is engaged with the cam groove in the cam frame, the second lens group, and the third lens group are advanced together with the float key in the cam frame. In this case, in some cases, the first lens frame and the third lens frame are moved together upon zooming in order to simplify the mechanism and provide precision.

For the type of zoom lens barrel in which the first lens frame and the third lens frame are moved together, when the performance of the camera is considered, in any of the multistage advancing type zoom lens barrels, the positions of the first lens frame and the third lens frame with respect to a film plane are important. Particularly, it is desirable to position the third lens group, which is closer to the film plane, with high precision.

In the above multistage zoom lens barrel, the structure of the lens frame assembly is complicated and the weight of the entire zoom lens barrel is heavy. On the other hand, however, further reduction in size and weight of the compact zoom camera is demanded. For the purpose of satisfying the demands, it is desired to realize the structure of a lens frame assembly with simple components in which first and third lens frames are positioned with high precision in a simple configuration and a space between the first and third lens frames can be reduced upon collapsing.

For this kind of related arts, a zoom lens barrel disclosed in Japanese Unexamined Patent Application Publication No. 11-64714 is known. According to the proposal, in the zoom lens barrel, a plurality of lens groups constituting a photographic optical system are moved interlockingly along an optical axis to perform the zooming operation in a predetermined range. The zoom lens barrel comprises: a first lens group supporting cylinder for supporting a first lens group; a second lens group supporting cylinder for supporting a second lens group; a cam cylinder for supporting the first lens group supporting cylinder and the second lens group supporting cylinder so that they are movable relative to each other along the optical axis; and driving cam means having a cam including a first cam area to move the first lens group supporting cylinder along the optical axis and a second cam area to move the second lens group supporting cylinder along the optical axis, the cam being formed so that a part of the first cam area and the second cam area is shared by the first lens group supporting cylinder and the second lens group supporting cylinder during the zooming operation in the predetermined range.

Thus, the accomplishment of the following object is attempted. According to the object, a movable range of each lens group can be sufficiently maintained without increasing the size of the cam cylinder and the entire length of the zoom lens barrel upon collapsing can be shorter than that of the conventional one.

However, the zoom lens barrel disclosed in Japanese Unexamined Patent Application Publication No. 11-64714 is constructed in such a manner that a zoom pin, whose base end constitutes a retaining portion for preventing slipping from a thrust receiving hole, is inserted through the thrust receiving hole formed in an external flange at the front end of the third lens frame. Accordingly, the zoom lens barrel has the following disadvantages. When a first lens frame and a third lens frame are positioned, it is difficult to position them with high precision. The zoom lens barrel requires a space for the thrust receiving hole and a length as long as the zoom pin from the viewpoint of the structure. Therefore, it is difficult to further reduce the length of the zoom lens barrel upon collapsing. Furthermore, when a manufacturing process is considered, the process is complicated because the operation of forming the thrust receiving hole and the operation of attaching the zoom pin are needed, resulting in high cost.

OBJECT AND SUMMARY OF THE INVENTION

It is an object of the present invention to accomplish positioning of first and third lens frames with high precision using simple components and to realize compactness, a simple manufacturing process, and a reduction in manufacturing cost.

In brief, a lens barrel according to the present invention includes:

a first lens group;

a first frame member supporting the first lens group;

a second lens group;

a second frame member supporting the second lens group, the second frame member being movable forward and backward relative to the first frame member along an optical axis;

a cam follower provided for the first frame member;

a cam frame member having a cam groove which is engaged with the cam follower to permit the first frame member to be movable forward and backward along the optical axis;

a contact portion provided for the second frame member, the contact portion being capable of coming into contact with the cam follower; and a pushing member for pushing the second frame member in a direction in which the cam follower comes into contact with the contact portion, wherein when the second frame member is pushed by the pushing member, the contact portion comes into contact with the cam follower to restrict a position of the second lens group with respect to the first lens group.

The object and advantages of the present invention will become further apparent from the following detailed explanation.

DETAILED DESCRIPTION OF THE PREFERRED EMBODIMENTS

Embodiments of the present invention will now be described hereinbelow with reference to the drawings.

FIGS. 1 to 5B show a zoom lens barrel according to a first embodiment of the present invention.

Figure 1:
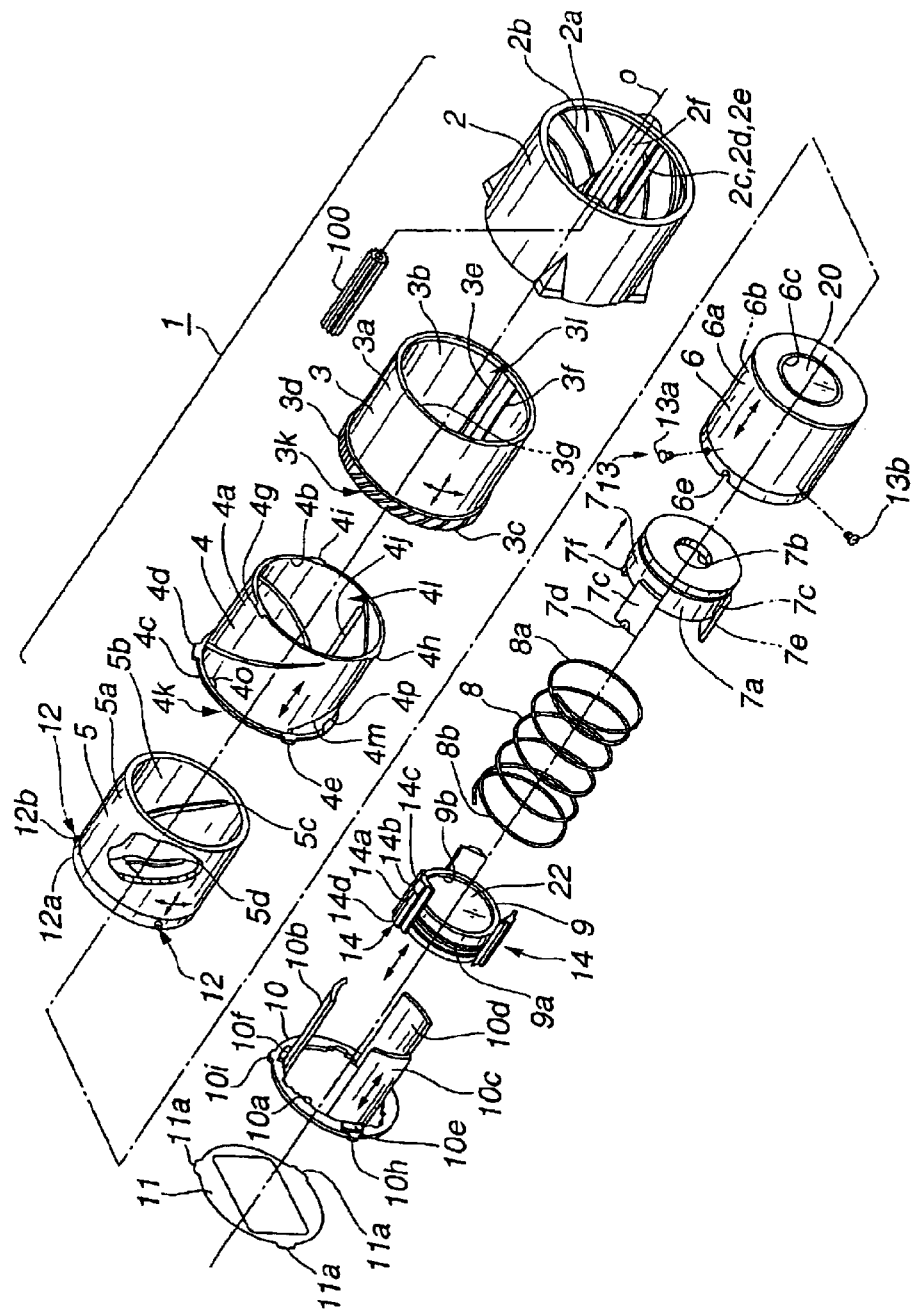
FIG. 1 is an assembly perspective view of a zoom lens barrel according to a first embodiment of the present invention.

In the following description, it is assumed that an object side of the zoom lens barrel is set to a front side and an image side is set to a rear side. It is assumed that an optical axis of the zoom lens comprising a first lens group, a second lens group, and a third lens group is set to an optical axis O. The direction parallel to the optical axis O is set to a direction S0. A rotational direction around the optical axis O is designated by a rotational direction observed from the object side. In FIG. 1, arrows designate the above directions corresponding to the movements of components.

Figure 2A:
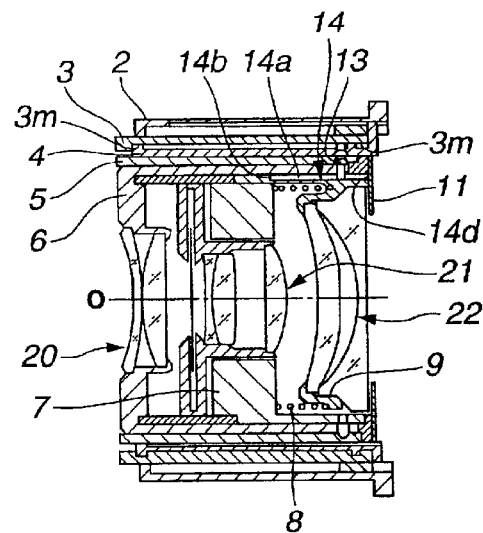
FIG. 2A is a sectional view of the configuration of the zoom lens barrel according to the first embodiment in a collapsed state.
Figure 2B:
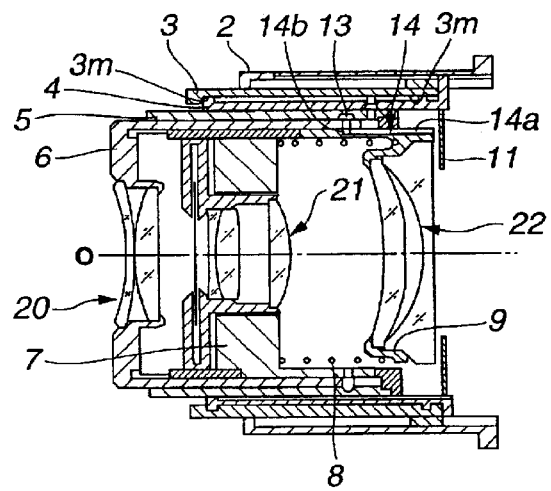
FIG. 2B is a sectional view of the configuration of the zoom lens barrel according to the first embodiment in a wide angle state.
Figure 2C:
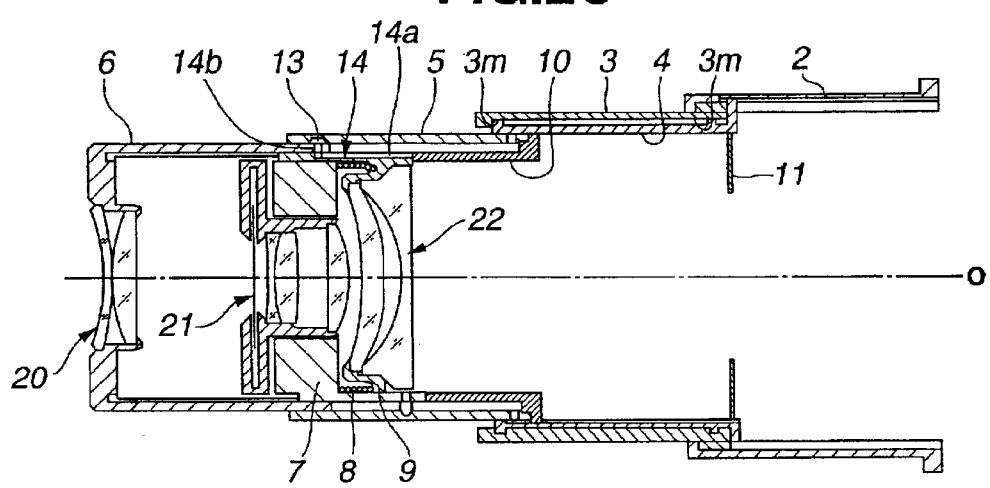
FIG. 2C is a sectional view of the configuration of the zoom lens barrel according to the first embodiment in a telephoto state.

According to the first embodiment of the present invention, as shown in FIGS. 1, 2A, 2B, and 2C, the main portion of a zoom lens barrel 1 includes: a stationary frame 2 which is fixed to a camera body and is supported thereby as shown in FIG. 2C; a rotary frame 3 which is fit into the stationary frame 2 and then rotates and moves forward and backward; a movable frame 4 which is fit into the rotary frame 3 rotatably relative to the rotary frame 3, and then moves straight forward and backward together with the rotary frame 3 in the direction S0 along the optical axis O; a cam frame 5 which is fit into the movable frame 4 and then rotates and moves forward and backward; a first lens frame 6 which is fit into the cam frame 5 and then moves straight forward and backward in the direction S0; a second lens frame 7 which is fit into the first lens frame 6 and then moves straight forward and backward; a third lens frame 9 which is fit into the first lens frame and then moves straight forward and backward in the direction S0; a spring 8 which is disposed between the second lens frame 7 and the third lens frame 9 and which serves as a pushing member for pushing the third lens frame 9 away from the first lens frame; a float key 10 which is held at the rear of the foregoing cam frame 5 and which moves straight forward and backward together with the cam frame 5 in the direction S0; a flare diaphragm 11 held at the rear of the movable frame 4; and a driving gear 100 which is disposed in the stationary frame 2 and transmits a driving force transmitted from a zoom unit (not shown) to the rotary frame 3.

The zoom lens barrel 1 further has a first lens group 20 held by the first lens frame 6, a second lens group 21 held by the second lens frame 7, and a third lens group 22 held by the third lens frame 9 serving as a photographic zoom lens optical system.

The stationary frame 2 is an annular member whose front (object-side) and rear (image-side) ends are opened. On an inner periphery 2a thereof, a helical female thread 2b, three straight recessed grooves 2c, 2d, and 2e (only 2c is shown) which are arranged at different positions in the circumferential direction and extend along the optical axis O, and a recessed gear room 2f extending along the optical axis O are formed.

The rotary frame 3 is an annular member whose front and rear ends are opened. At the rear (image-side) end of the outer periphery 3a thereof, a helical male thread 3c having a predetermined width in the direction of the optical axis O is formed and a gear portion 3d is formed in a predetermined area on the periphery where the helical male thread 3c is arranged. In this instance, the rear (image-side) opening of the rotary frame 3 is set to an opening 3k and the front (object-side) opening is set to an opening 3l.

An inner periphery 3b of the rotary frame 3 has a thrust passage groove 3e serving as a straight groove having an introduction opening formed at the rear opening 3k, a straight groove 3f for straight guiding the moveble frame 4, and a movable-frame thrust-receiving circumferential groove 3m shown in FIGS. 2A to 2C, the groove 3m serving as a circumferential groove communicating with the foregoing thrust passage groove 3e and being formed on the inside.

In the present zoom lens barrel, the helical male thread 3c of the rotary frame 3 is engaged with the helical female thread 2b of the stationary frame 2 in an assembly state. The rotary frame 3 moves forward and backward into/from the stationary frame 2 along the optical axis O while rotating. The driving gear 100 formed by a spur gear, which is long in the axial direction, is rotatably inserted into the gear room 2f of the stationary frame 2 in parallel to the optical axis O. The driving gear 100 is always engaged with the gear portion 3d of the rotary frame 3 to transmit a rotating force to the rotary frame 3.

The movable frame 4 is an annular member whose front and rear ends are opened. The rear (image-side) opening is set to an opening 4k and the front (object-side) opening is set to an opening 4l. A flange 4c is formed at the rear opening 4k on an outer periphery 4a of the movable frame 4. On the flange 4c, protruded straight guides 4d, 4e, and 4f (not shown) are formed in the radial direction.

Further, on the outer periphery 4a of the movable frame 4, three straight guiding protrusions 4o, 4p, and 4q (not shown) extending outward in the radial direction are formed at positions slightly away from the flange 4c on the side of the rear opening 4k. Three auxiliary straight guiding protrusions 4g, 4h, and 4i extending outward in the radial direction on the side of the front opening 4l are formed at front positions corresponding to the straight guiding protrusions 4o, 4p, and 4q in the axial direction.

On an inner periphery 4b of the movable frame 4, three straight grooves 4j each having a bottom and each extending along the optical axis O, and three spiral penetrating cam grooves 4m are formed. The width of each cam groove 4m gradually becomes narrower from the inner surface 4b to the outer surface 4a. The section of the groove is V-shaped. That is, each groove has slopes facing each other. Each of the cam grooves 4m communicates with a cam follower introduction opening (not shown) formed on the flange 4c. The flare diaphragm 11 made of a thin plate with an opening is fixed to the rear end of the movable frame 4 by wellknown bayonet mounting.

In the assembly state of the present zoom lens barrel, the straight guides 4d, 4e, and 4f of the movable frame 4 are slidably fit into the straight grooves 2c, 2d, and 2e of the stationary frame 2. Further, the three straight guiding protrusions 4o, 4p, and 4q and the auxiliary straight guiding protrusions 4g, 4h, and 4i of the movable frame 4 are inserted into the introduction grooves 3e of the rotary frame 3, respectively, and are then introduced to be rotatably and slidably fit into the movable-frame thrust-receiving circumferential grooves of the rotary frame 3 with no clearance in the axial direction. Consequently, the movable frame 4 does not rotate with respect to the stationary frame 2 and moves straight in the direction S0 together with the rotary frame 3 which rotates and moves.

The straight guiding protrusions 4o, 4p, and 4q and the auxiliary straight guiding protrusions 4g, 4h, and 4i, which face with each other in the axial direction of the movable frame 4, are fit into the movable-frame thrust-receiving circumferential grooves 3m of the rotary frame 3, respectively. Accordingly, when an external force in the direction of the optical axis O affects the cam frame 5 which will be explained later and which is fit into the movable frame 4 so as to be movable forward and backward therein, or the first lens frame 6 which is fit into the cam frame 5 so as to be movable forward and backward therein, the external force is received by double engagement of the straight guiding protrusions 4o, 4p, and 4q and the auxiliary straight guiding protrusions 4g, 4h, and 4i of the movable frame 4 with the rotary frame 3. Therefore, the straight guiding protrusions 4o, 4p, and 4q and the auxiliary straight guiding protrusions 4g, 4h, and 4i are not broken, resulting in an increase in strength against the external force.

The cam frame 5 is an annular cam frame member whose front and rear ends are opened. Three cam followers 12 are fixed to the rear of an outer periphery 5a of the cam frame 5. Each cam follower 12 is composed of two segments, namely, a taper cam follower segment 12a on the bottom side and a small-diameter straight cam follower segment 12b on the top side.

Figure 3:
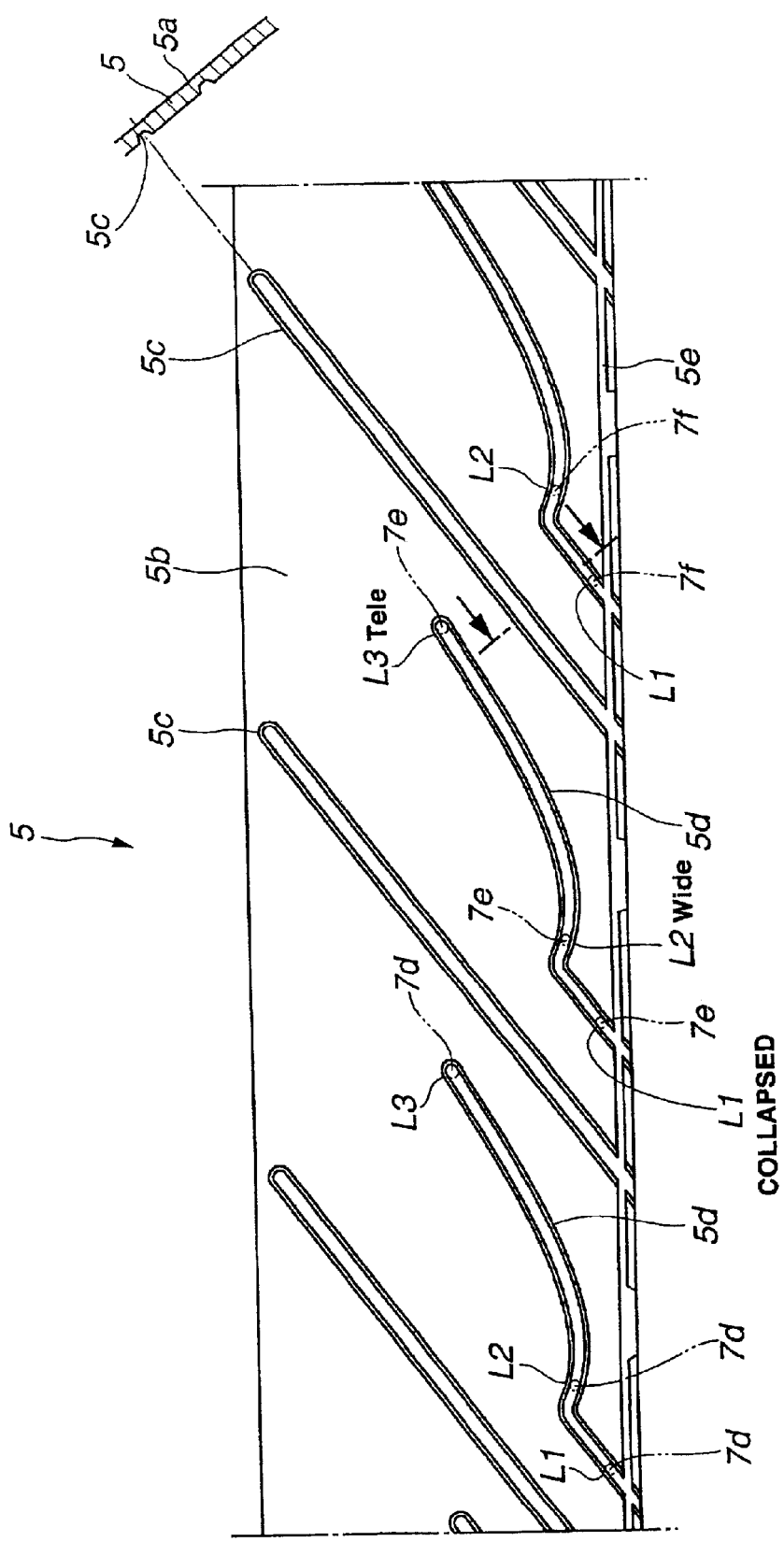
FIG. 3 is a development view of the inner surface of a cam frame in the zoom lens barrel of the first embodiment.

As shown in the development view of the cam frame in FIG. 3, on an inner periphery 5b of the cam frame 5, there are formed three cam grooves 5c (hereinbelow, referred to as first cam grooves) for the first lens frame, and three cam grooves 5d (hereinbelow, referred to as second cam grooves) for the second lens frame, each second cam groove extending in the same direction as that of the first cam groove 5c without intersecting the first cam groove 5c.

Circumferential grooves 5e (refer to FIG. 3) for coupling with the float key 10 along the optical axis are formed at the rear end of the inner periphery 5b.

In the assembly state of the present zoom lens barrel, each cam follower 12 of the cam frame 5 is introduced through the introduction opening of the cam groove 4m of the movable frame 4. The straight cam follower segment 12b of each cam follower 12 is slidably fit into the straight groove 3f of the rotary frame 3 while being inserted in the cam groove 4m of the movable frame 4. The taper cam follower segment 12a of each cam follower 12 is slidably fit into the foregoing V-shaped cam groove 4m of the movable frame 4. Therefore, the cam frame 5 is advanced and retracted in the direction of the optical axis O along the cam grooves 4m of the movable frame 4 while being rotated together with the rotary frame 3.

In the present zoom lens barrel, the components including the first lens frame 6, the second lens frame 7, and the third lens frame 9, which will be described later, undergo improvements.

The first lens frame 6 is an annular member whose rear end is opened and which has a lens holding portion 6c for holding the first lens group 20 at the front end. On an inner periphery 6b of the first lens frame 6, second lens frame straight guiding grooves (hereinbelow, referred to as second straight guiding grooves), third lens frame straight guiding grooves (hereinbelow, referred to as third straight guiding grooves), and straight guiding grooves for the float key, each groove being not shown, are formed.

According to the present embodiment, further, three first pins 13a, 13b, and 13c serving as cam followers are pressed and fixed to an outer periphery 6a of the first lens frame 6 at the rear end (on the image side). Three notches 6e, 6f, and 6g serving as clearances, which second pins 7d, 7e, and 7f of the second lens frame 7 are fit into when the present zoom lens barrel is collapsed, are formed at the rear end of the first lens frame 6.

In the assembly state of the present lens barrel, the first lens frame 6 is fit into the cam frame 5 so that the first pins 13a, 13b, and 13c are engaged with the first cam grooves 5c of the cam frame 5. Simultaneously, straight guiding portions 10b, 10c, and 10d of the float key 10, which will be described later, are slidably fit into the float key guiding grooves (not shown) of the first lens frame 6. Accordingly, the first lens frame 6 advances and retracts straight along the optical axis O in association with the rotation of the cam frame 5 without being rotated because the float key 10 restrains the rotation of the first lens frame 6.

The second lens frame 7 is a substantially annular frame member having a center opening 7b. On three extensions of an outer periphery 7a thereof, three straight guiding portions 7c (hereinbelow, referred to as second straight guiding portions) for the second lens frame are formed. The second pins 7d, 7e, and 7f to be engaged with the cam grooves 5d of the cam frame 5 are fixed to the second straight guiding portions 7c. The second lens group 21 is held in the center opening 7b. Further, a shutter unit and a focusing unit, which are not shown, are disposed in the second lens frame 7.

In the assembly state of the present zoom lens barrel, the second lens frame 7 is slidably fit into the first lens frame 6 along the optical axis O so that the three second straight guiding portions 7c on the outer periphery 7a are engaged with the second straight guiding grooves of the first lens frame 6. The first lens frame 6, in which the second lens frame 7 is fit, is fit into the cam frame 5 so that the second pins 7d, 7e, and 7f on the second straight guiding portions 7c are engaged with the second cam grooves 5d of the cam frame 5. Therefore, the second lens frame 7 is guided in the direction S0 by the second straight guiding grooves of the first lens frame 6 and is then moved forward and backward along the optical axis O by the second cam grooves 5d of the cam frame 5.

The third lens frame 9 is an annular frame member which has a center opening 9b and holds the third lens group 22 by the center opening 9b. On an outer periphery 9a thereof, three extensions 14 extending along the optical axis are formed.

Each extension 14 includes a straight guiding portion 14c (hereinbelow, referred to as a third straight guiding portion) for the third lens frame, the guiding portion being formed on the surface of the extension 14 and being engaged with the third straight guiding groove on the inner periphery of the first lens frame 6, and a first pin sliding groove 14a which is formed in the third straight guiding portion 14c and is engaged with the first pin 13 protruded on the inner periphery of the first lens frame 6.

Each of the first sliding grooves 14a is formed in a predetermined length. The front end thereof on the front side toward the object (on the side of the first lens frame 6) serves as a positioning portion 14b for positioning the third lens frame 9 with respect to the first lens frame 6. On the other hand, the rear end of each extension 14 on the image side (on the side of the flare diaphragm 11) serves as a contact portion 14d which comes into contact with a predetermined portion of the flare diaphragm 11 upon collapsing to restrict the movement of the third lens frame 9.

In the assembly state of the present zoom lens barrel, the third lens frame 9 is slidably fit into the first lens frame 6 along the optical axis O so that the third straight guiding portions 14c of the three extensions 14 on the outer periphery 9a of the third lens frame 9 are engaged with the third straight guiding grooves of the first lens frame 6 and, simultaneously, the first pins 13 protruded on the inner periphery of the first lens frame 6 are engaged with the first pin sliding grooves 14a of the three extensions 14. Consequently, the third lens frame 9 is guided in the direction S0 by the third straight guiding grooves and the first pins 13 of the first lens frame 6 and is then moved forward and backward relative to the first lens frame 6 along the optical axis O.

According to the present embodiment, in order to position the first lens frame 6 and the third lens frame 9 with high precision, the spring 8 serving as a pushing member is inserted between the second lens frame 7 and the third lens frame 9.

The spring 8 is disposed so that the end thereof toward the object is contacted to the insides of the second guiding portions 7c of the second lens frame 7 and, on the other hand, the end thereof on the image side is contacted to the insides of the extensions 14 of the third lens frame 9. Consequently, the third lens frame 9 is always pushed away from the first lens frame 6 along the optical axis O by the spring 8. In other words, from a collapsing position to a wide angle position or a telephoto position, the first pins 13 of the first lens frame 6 are restricted by the positioning portions 14b of the first sliding grooves 14a of the third lens frame 9 with the pushing force of the spring 8, so that the first lens frame 6 and the third lens frame 9 are held so as to have a predetermined space. Thus, zooming can be accomplished.

The float key 10 is an annular member having an opening 10a. Three protruded guiding portions 10h, 10i, and 10j extending in the radial direction are formed on an outer periphery of the annular member. The three straight guiding portions 10b, 10c, and 10d to be engaged with the float key straight guiding grooves (not shown) formed on the inner periphery of the first lens frame 6 are formed in the float key 10 along the optical axis. Bayonets 10e, 10f, and 10g to be bayonet-engaged with the circumferential grooves 5e of the cam frame 5 are formed at the rear portions of the straight guiding portions 10b, 10c, and 10d on the side of the annular member, respectively.

In the assembly state of the present zoom lens barrel, the straight guiding portions 10b, 10c, and 10d of the float key 10 are slidably fit into the float-key straight guiding portions (not shown) of the first lens frame 6 along the optical axis O. The guiding portions 10h, 10i, and 10j of the float key 10 are engaged with the straight grooves 4j of the movable frame 4. The three bayonets 10e, 10f, and 10g are slidably engaged with the circumferential grooves 5e of the cam frame 5. Thus, the float key 10 is supported so as to be movable forward and backward in the direction S0 without rotating and is also supported so as to move integrally relative to the cam frame 5 along the optical axis O.

The flare diaphragm 11 is disposed on the rear of the float key 10 on the image side. The flare diaphragm 11 is an annular member, made of a metal plate, having an opening. On the outer periphery thereof, three bayonets 11a to fix the flare diaphragm to the image-side rear end of the movable frame 4 by bayonet mounting are provided.

The contact portions 14d of the extensions 14 of the third lens frame 9 come into contact with predetermined portions near the opening on the front surface of the flare diaphragm 11 upon collapsing (this state is not shown). In other words, in the collapsing operation, the contact portions 14d come into contact with the front surface of the flare diaphragm 11 to restrain the movement of the third lens frame 9 toward the image, so that the space between the first lens frame 6 and the third lens frame 9 can be narrowed against the pushing force of the spring 8. Thus, in collapsing mode, the contact permits to position the third lens frame 9. As mentioned above, according to the present embodiment, the flare diaphragm 11 also functions as a thrust unit to thrust the third lens frame 9 against the spring 8 in the collapsing mode.

Next, the advancing and retracting operations of the zoom lens barrel having the above configuration according to the present embodiment upon zooming will now be described in detail with reference to FIGS. 2A, 2B, 2C, 3, and 4.

When the present zoom lens barrel 1 is collapsed, as shown in the sectional view of FIG. 2A, all of the frame members are received in the stationary frame 2. At that time, the contact portions 14d of the extensions 14 of the third lens frame 9 are in contact with the corresponding portions on the front surface of the flare diaphragm 11 to restrict the position of the third lens frame 9, thereby positioning with respect to a film plane. As shown in FIG. 3, the second pins 7d, 7e, and 7f of the second lens frame 7 are disposed in collapsed positions L1 of the second cam grooves 5d of the cam frame 5, the pins being engaged with the grooves.

In order to advance the present zoom barrel 1 from the collapsing position to a wide angle position (wide-angle end position) where photographing can be performed as shown in the sectional view of FIG. 2B, the driving gear 100 is rotated clockwise by a predetermined amount through the zoom unit (driving mechanism), which is not shown. Thus, the rotary frame 3 is advanced while being rotated by the rotation of the driving gear 100. At that time, the movable frame 4, which is guided straight in the direction S0, moves straight forward relative to the rotary frame 3.

The cam frame 5 is rotated similar to the rotary frame 3 through the cam followers 12 and is then advanced farther than the rotary frame 3 by the cam grooves 4m of the movable frame 3.

Since the first lens frame 6 is guided straight in the direction S0 through the float key 10, the first pins 13 are moved along the first cam grooves 5c in association with the rotation of the cam frame 5. Thus, the first lens frame 6 is advanced to the wide-angle end position forwardly from the cam frame 5.

The second lens frame 7 is advanced to the wide-angle end position by the cam frame 5 while the second straight guiding portions 7c are being engaged with the second straight guiding grooves of the first lens frame 6 and are then being guided straight in the direction S0.

In other words, the second pins 7d, 7e, and 7f are moved along the second cam grooves 5d of the cam frame 5 which is rotating, so that the second lens frame 7 is advanced to the wide-angle end position. At this time, as shown in FIG. 3, the second pins 7d, 7e, and 7f of the second lens frame 7 are placed in wide angle positions L2 of the second cam grooves 5d of the cam frame 5, the second pins being engaged with the grooves.

According to the present embodiment, the third lens frame 9 is guided straight in the direction S0 while the third straight guiding portions 14c are engaged with the third straight guiding grooves of the first lens frame 6. Simultaneously, the third lens frame 9 is always pushed away from the first lens frame 6 along the optical axis O by the spring 8. Accordingly, the third lens frame 9 is advanced to the wide-angle end position at a predetermined distance from the first lens frame 6 from the collapsed state to the wide angle state. That is, since the first pins 13 of the first lens frame 6 are restricted by the positioning portions 14b of the first sliding grooves 14a in the extensions 14 with the pushing force of the spring 8, the first lens frame 6 and the third lens frame 9 are advanced together so as to have a predetermined space therebetween.

In order to advance the present zoom lens barrel 1 from the wide angle position to a telephoto position (telephoto end position) shown in the sectional view of FIG. 2C, the driving gear 100 is further rotated clockwise by a predetermined amount. Thus, the rotary frame 3 is advanced while being rotated by the rotation of the driving gear 100. Similarly, the movable frame 4 is guided straight and the cam frame 5 is advanced forward from and relative to the rotary frame 3 while being rotated.

The first lens frame 6 is further advanced to the telephoto end position forward from the cam frame 5 in association with the rotation of the cam frame. The second lens frame 7 is also advanced to the telephoto end position by the second cam grooves 6d through the second pins 7d, 7e, and 7f. At this time, as shown in FIG. 3, the second pins 7d, 7e, and 7f of the second lens frame 7 are placed in telephoto end positions L3 of the second cam grooves 5d of the cam frame 5, the second pins being engaged with the grooves.

According to the present embodiment, the third lens frame 9 is advanced together with the first lens frame 6 from the wide-angle end position to the telephoto end position so as to have a space therebetween, the space being held by restricting the positioning portions 14b of the first sliding grooves 14a with the first pins 13 at the wide angle position. That is, the space between the first lens frame 6 and the third lens frame 9 is not changed until zooming is performed at the telephoto end position.

On the other hand, in order to retract the present zoom lens barrel 1 so as to collapse the barrel, the driving gear 100 is rotated counterclockwise through the zoom unit (driving mechanism), which is not shown. Due to the rotation of the driving gear 100, the rotary frame 3, the movable frame 4, and the cam frame 5 are retracted relative to each other. Further, the first lens frame 6 and the second lens frame 7 are retracted to the collapsing position relative to each other by counter rotation of the cam frame 5. At this time, in a reverse manner of the zooming operation, the first lens frame 6 and the third lens frame 9 are retracted together with a predetermined space therebetween from the telephoto end position to the wide-angle end position. The space therebetween is reduced from the wide angle position to the collapsing position, thus resulting in a predetermined space. The frames are then retracted to the collapsing position with the predetermined space therebetween.

As mentioned above, when the present zoom lens barrel 1 is moved between the wide angle and telephoto positions, the space between the first lens frame 6 and the third lens frame 9 is kept constant. Thus, the space between the first lens group 20 held by the first lens frame 6 and the third lens group 22 held by the third lens frame 9 is kept constant.

Figure 4:
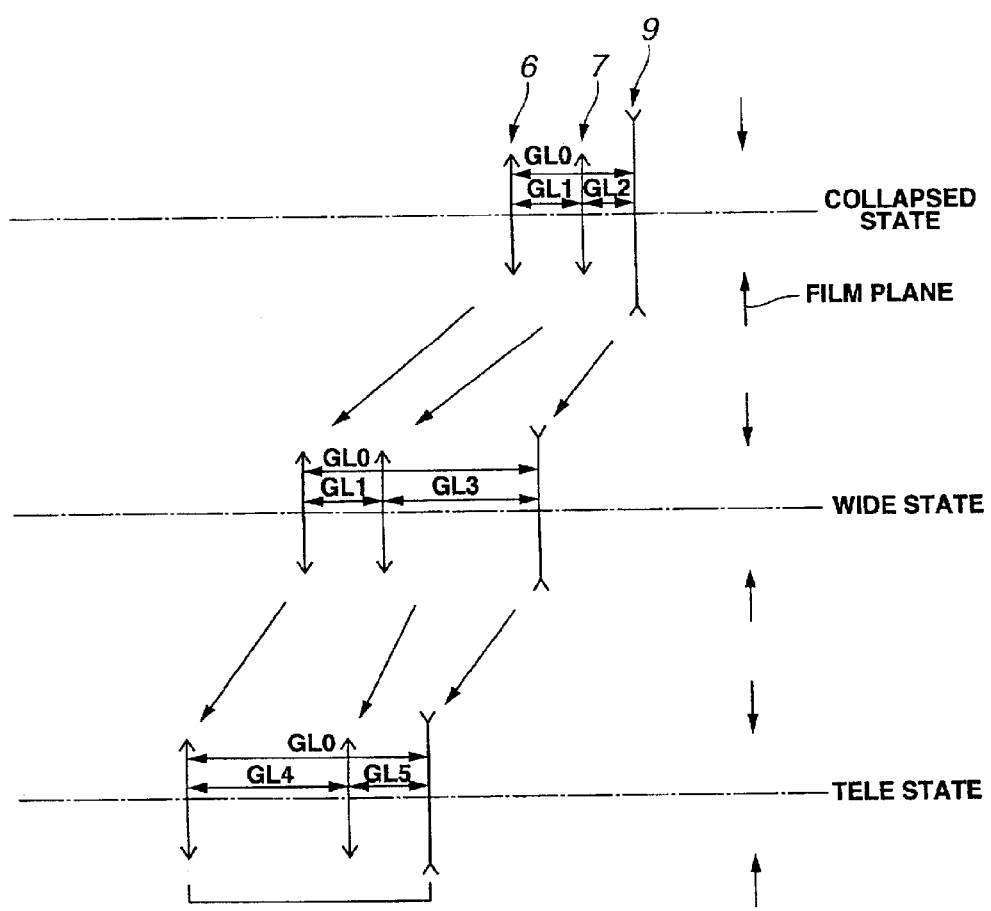
FIG. 4 is a diagram schematically showing the relation between distances of lens groups traveled by zooming in the zoom lens barrel according to the first embodiment.

FIG. 4 shows the relation between the distances of the first lens frame and the third lens frame traveled in the zooming operation. The relation between the distances of the first lens group and the third lens group is similar to the above.

In other words, according to the present embodiment, when the present zoom lens barrel 1 is collapsed, as shown in FIG. 4, the first lens frame 6 and the third lens frame 9 are received in the stationary frame 2 so as to have a predetermined space therebetween. In this instance, it is assumed that the space between the first lens frame 6 and the second lens frame 7 is set to GL1, the space between the second lens frame 7 and the third lens frame 9 is set to GL2, and the space between the first lens frame 6 and the third lens frame 9 is set to GL0. The third lens frame 9 is retracted until the contact portions 14d of the extensions 14 of the third lens frame 9 are come into contact with the predetermined portions of the flare diaphragm 11, thus GL0 can be remarkably reduced.

In other words, each first pin 13 of the first lens frame 6 is moved to the end (on the image side) of each first sliding groove 14a against the pushing force of the spring 8, so that the space GL0 between the first lens frame 6 and the third lens frame 9 can be reduced.

When the present zoom lens barrel 1 is advanced from the collapsing position to the wide-angle end position (wide angle state), as shown in FIG. 4, the first lens frame 6, the second lens frame 7, and the third lens frame 9 are advanced relative to each other so that the space between the first lens frame 6 and the third lens frame 9 is widened.

Figure 5B:
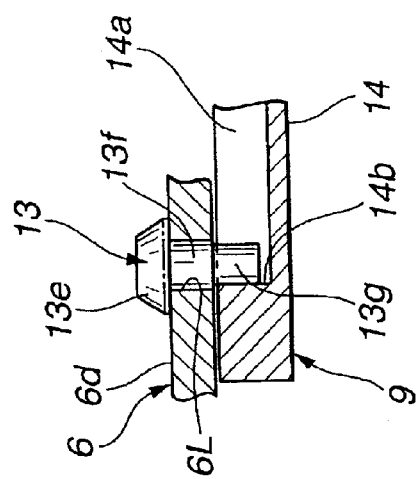
FIG. 5B is a sectional view of a portion around a first pin provided on a first lens frame in the zoom lens barrel according to the first embodiment.
Figure 5A:
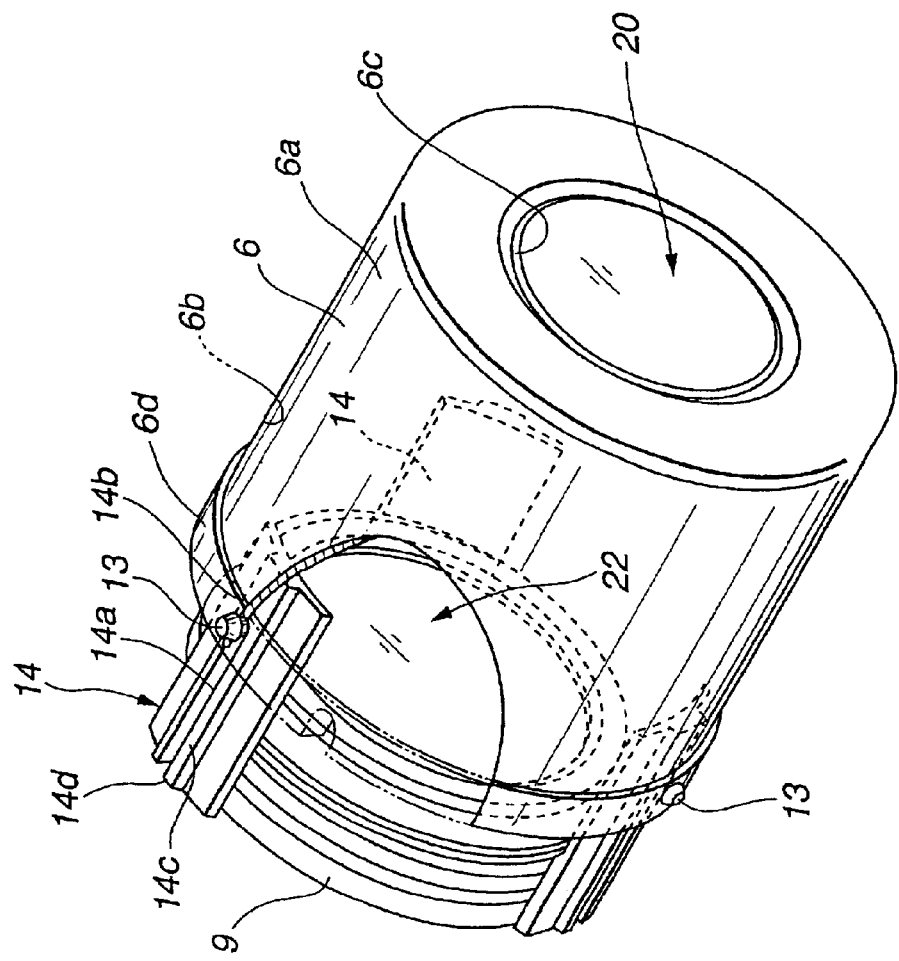
FIG. 5A is an enlarged perspective view of the lens frames in the zoom lens barrel of the first embodiment.

In this case, as shown in FIGS. 5A and 5B, the third lens frame 9 is pushed away from the first lens frame 6 along the optical axis O by the pushing force of the spring 8 (not shown). Accordingly, when each first pin 13 of the first lens frame 6 comes into contact with the positioning portion 14b of each first sliding groove 14a formed on each extension 14 of the third lens frame 9, the third lens frame 9 is positioned with respect to the first lens frame 6 and the space between the first lens frame 6 and the third lens frame 9 is set to the predetermined space GL0.

As shown in FIG. 5B, each first pin 13 comprises a cam follower segment 13e which engages with the first cam grooves 5c of the cam frame 5, an insertion segment 13f which is pushed into and fixed to an attachment hole 6L, formed on the first lens frame 6, and a positioning protrusion 13g which is slidably fit into the first sliding groove 14a provided on the third lens frame 9 and which comes into contact with the positioning portion 14b to position the third lens frame 9 with respect to the first lens frame 6. The first pin 13 is molded in one piece.

With the configuration, therefore, the space GL1 between the first lens frame 6 and the second lens frame 7 at the wide-angle end position is not changed from that at, for example, the collapsing position. Further, when the space between the second lens frame 7 and the third lens frame 9 is increased to a space GL3, the space GL0 between the first lens frame 6 and the third lens frame 9 is larger than that at the collapsing mode.

After that, when the present zoom lens barrel 1 is advanced from the wide-angle end position to the telephoto end position (telephoto state), as shown in FIG. 4, the first lens frame 6, the second lens frame 7, and the third lens frame 9 are advanced relative to each other so that the space GL0 between the first lens frame 6 and the third lens frame 9 is not changed but only the space between the first lens frame 6 and the second lens frame 7 is widened. That is, a space GL4 between the first lens frame 6 and the second lens frame 7 is longer than that in the wide angle state. On the contrary, a space GL5 between the second lens frame 7 and the third lens frame 9 is shorter than that in the wide angle state.

According to the present embodiment, therefore, due to the configuration including the spring 8 for always pushing the third lens frame away from the first lens frame 6 along the optical axis, the extensions 14 each having the first pin sliding groove 14a for maintaining the space between the first lens frame 6 and the third lens frame 9 constant during the zooming operation using the pushing force of the spring 8 and for enabling the reduction of the space between the first lens frame 6 and the third lens frame 9 upon collapsing, and the first pins 13 of the first lens frame 6, a the first lens frame 6 can be positioned with respect to the third lens frame 9 with high precision.

Since the space between the first lens frame 6 and the third lens frame 9 upon collapsing can be reduced, it is a matter of course that compactness can be accomplished. Furthermore, since each first pin 13, generally used for advancing, is also used serving as a stopper for positioning the third lens frame 9 as mentioned above, the compactness can be implemented with a simple configuration. Thus, a manufacturing process can be simplified and a manufacturing cost can be reduced.

Further, since the third lens frame 9 is positioned with respect to the first pins 13 for positioning the first lens frame 6 in the direction of the optical axis, the third lens frame 9 can be positioned with respect to the film plane with higher precision.

Figure 6A:
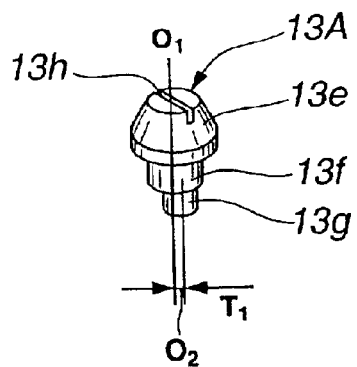
FIG. 6A is a perspective view of a first modification of the first pin in the zoom lens barrel of the first embodiment.
Figure 6B:
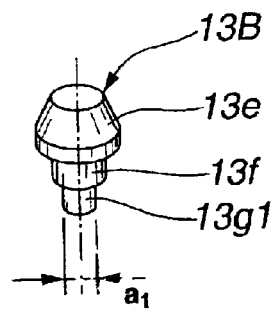
FIG. 6B is a perspective view of a second modification of the first pin in the zoom lens barrel of the first embodiment.
Figure 6C:
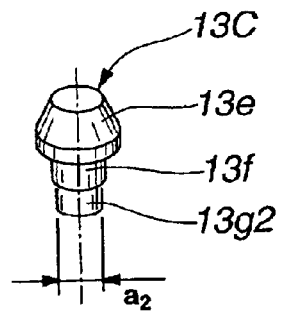
FIG. 6C is a perspective view of a third modification of the first pin in the zoom lens barrel of the first embodiment.

Next, FIGS. 6A, 6B, and 6C illustrate modifications of the first pin in the zoom lens barrel according to the first embodiment.

According to first to third modifications, the shape of the protrusion of the first pin for restricting the position of the third lens frame is selected at any time. Thus, the tilt or position of the third lens frame with respect to the first lens frame can be adjusted.

FIG. 6A shows the fist modification of the first pin having an eccentric structure. FIG. 6B shows the second modification of the first pin having a small-diameter positioning protrusion. FIG. 6C shows the third modification of the first pin having a large-diameter positioning protrusion.

Figure 7A:
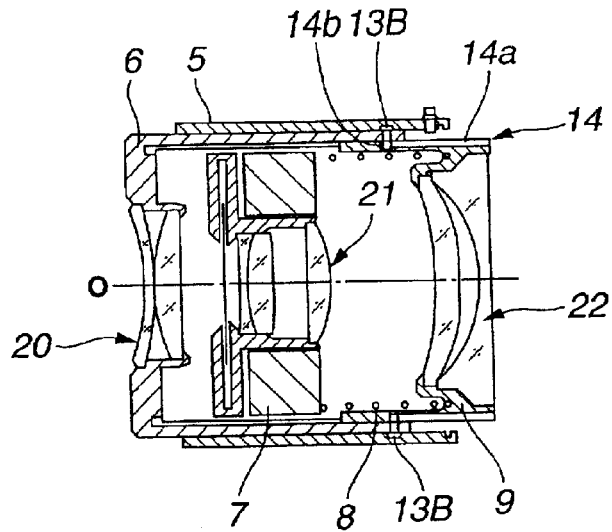
FIG. 7A is a sectional view of the zoom lens barrel using the first pins having the same size when the tilt of a third lens frame is adjusted by the first pins according to any one of the foregoing first to third modifications.
Figure 7B:
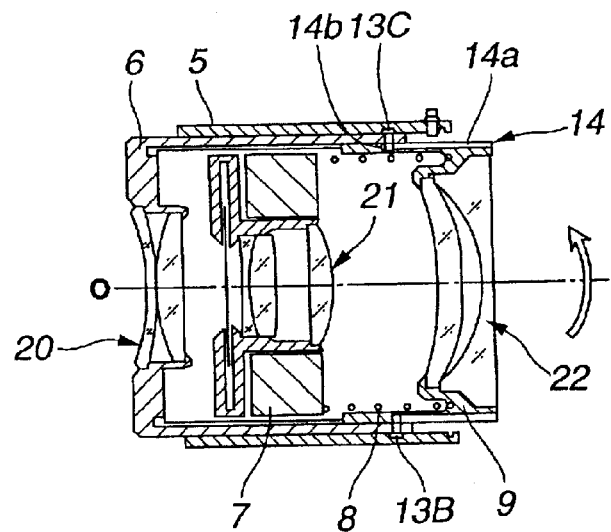
FIG. 7B is a sectional view of the zoom lens barrel using the first pins having different sizes when the tilt of the third lens frame is adjusted by the first pins according to any one of the foregoing first to third modifications.

FIGS. 7A and 7B are diagrams for explaining the operation when the tilt of the third lens frame is adjusted using any of the modifications of the first pin shown in FIGS. 6A, 6B, and 6C. FIG. 7A is a sectional view of the zoom lens barrel using the first pins having the same diameter. FIG. 7B is a sectional view of the zoom lens barrel using the first pins having different diameters.

The case where the tilt of the third lens frame is adjusted using any of the modifications of the first pin shown in FIGS. 6A, 6B, and 6C will now be described.

Generally, in the zoom lens barrel of the type that the first lens frame 6 and the third lens frame 9 are advanced relative to each other, the tilt of the third lens frame 9 with respect to the first lens frame 6 and a clearance between the first lens frame 6 and the third lens frame are important to optimize the optical performance because the third lens frame 9 is disposed the closest to the film plane. It is preferable that the tilt be small and the clearance between the first lens frame 6 and the third lens frame 9 be set to a predetermined clearance.

However, the diameter of the attachment hole 6L (refer to FIG. 5B), to which the first pin 13 of the first lens frame 6 is pressed into, may be deviated from a position, where the hole should be formed, for reasons in manufacturing. When the pins 13 having the same shape are used, the third lens frame 9 may be tilted with respect to the optical axis O and the first lens group 6.

Accordingly, in the zoom lens barrel 1 according to the present invention, even if the third lens frame 9 is tilted for reasons in manufacturing, the tilt of the third lens frame 9 can be simply adjusted. The performance of the camera can also be improved.

There are two adjusting methods. One of them is a method for absorbing a deviation causing the tilt using the first pins having an eccentric structure to adjust the tilt of the third lens frame 9. According to another method, a deviation causing the tilt is absorbed using the first pins having different diameters to adjust the tilt of the third lens frame 9.

The former adjusting method uses a first pin 13A having a configuration shown in, for example, FIG. 6A. As shown in the diagram, the first pin 13A is shaped substantially similar to that according to the first embodiment. An adjustment groove 13h, to which a screwdriver or the like for regulating turn is inserted, is formed on the cam follower segment 13e. Further, the first pin 13A is formed so that a center line O2 of the positioning contact portion 13g is deviated from a center line O1 of the cam follower segment 13e and the insertion segment 13f by only a predetermined distance T1.

The eccentricity (distance T1) of the positioning portion 13g can be changed. A plurality of kinds of first pins 13A having different eccentric structures can be formed so as to have different distances T1 as necessary. It is necessary to rotatably press the first pin 13A into the attachment hole 6L.

According to the above configuration, depending on the tilt of the third lens frame 9, the first pin 13A shown in FIG. 6A is used. Further, the first pin 13A is properly rotated by a screwdriver or the like through the adjustment groove 13h, so that the positioning protrusion 13g, which is in contact with the positioning portion 14b of the first sliding groove 14a of the third lens frame 9, is rotated. Thus, a clearance between the first lens frame 6 and the third lens frame 9 can be changed. In other words, the first pin 13A having the eccentric structure is used as any of at least the three first pins 13a, 13b, and 13c in order to adjust the clearance as necessary. Consequently, the tilt of the third lens frame 9 can be easily adjusted.

On the other hand, according to the latter adjusting method, for example, as shown in FIGS. 6B and 6C, the first pins 13B and 13C having different diameters are properly used to change the clearance between the first lens frame 6 and the third lens frame 9. Consequently, the tilt of the third lens frame 9 can be adjusted. As shown in FIG. 6B, the first pin 13B is formed into substantially the same shape of the first pin 13 used in the foregoing first embodiment. The positioning protrusion 13g is formed so as to have a diameter a1 smaller than that in the foregoing embodiment. As shown in FIG. 6C, the first pin 13C is formed so that the positioning protrusion 13g has a diameter a2 larger than that of the first pin 13B.

The diameter of the positioning protrusion 13g can be changed in the same way as in the foregoing adjusting method. A plurality of kinds of first pins 13B having different diameters can be formed as necessary.

For the present zoom lens barrel 1, when it is assumed that the zoom lens barrel 1 is formed using, for example, the first pins 13 having the same diameter, as shown in the sectional view of FIG. 7A, the first lens frame 6 and the third lens frame 9 are positioned with a predetermined clearance therebetween. However, in some cases, for reasons in manufacturing, the third lens frame 9 may be tilted with respect to the optical axis O and the first lens frame 6 as shown by an allow in FIG. 7B. In this case, according to the above adjusting method, as shown in FIG. 7B, the first pin 13B in the direction of tilt is replaced by the large-diameter first pin 13C and the first pin 13C is then pressed into the attachment hole 6L. Consequently, the positioning protrusion 13g of the first pin 13C is come into contact with the positioning portion 14b of the first sliding groove 14a. Thus, the clearance between the first lens frame 6 and the third lens frame 9 can be remarkably changed. That is, the tilt of the third lens frame 9 can be easily adjusted.

In the case where the tilt is adjusted using the first pins 13B and 13C having different diameters, if the three first pins 13 are properly changed as necessary, the tilt of the third lens frame 9 can be adjusted with high precision.

The case where the clearance between the first lens frame 6 and the third lens frame 9 is adjusted using the first pins shown in FIGS. 6A, 6B, and 6C will be continuously explained.

In some cases, due to manufacturing errors and assembling errors of parts in manufacturing as mentioned above, the clearance between the first lens frame 6 and the third lens frame 9 is not always set to a target value. As a matter of course, when the amount of deviation is equal to or smaller than a predetermined amount, the actual optical performance can be optimized. However, if the amount of deviation is larger than the predetermined value, it is preferable to adjust the clearance between the first lens frame 6 and the third lens frame 9.

The clearance adjustment can be performed in substantially the same way as in the foregoing tilt adjustment. In other words, when the eccentric first pin 13A shown in FIG. 6A is used, all of the first pins 13A disposed in the three positions in the circumferential direction are turned by the same amount. Thus, the position of the third lens frame 9 can be changed.

When the first pins 13B and 13C shown in FIGS. 6B and 6C are used, the first pins 13 including the protrusion 13g having an appropriate diameter can be used so that the amount of deviation can be corrected in accordance with the amount of deviation in the position of the third lens frame 9.

As mentioned above, when the clearance between the first lens frame 6 and the third lens frame 9 is adjusted, the adjustment can be easily performed without any separate mechanism.

If only the clearance between the first lens frame 6 and the third lens frame 9 is adjusted as mentioned above or the tilt of the third lens frame 9 is not adjusted, the three first pins 13 serving as positioning members for restricting the position of the third lens frame 9 are not always needed in the circumferential direction. Only one first pin can be placed in the circumferential direction.

According to the above-mentioned modifications, therefore, the tilt of the third lens frame 9 can be easily adjusted. Furthermore, the third lens frame 9 can be positioned with high precision.

Figure 8:
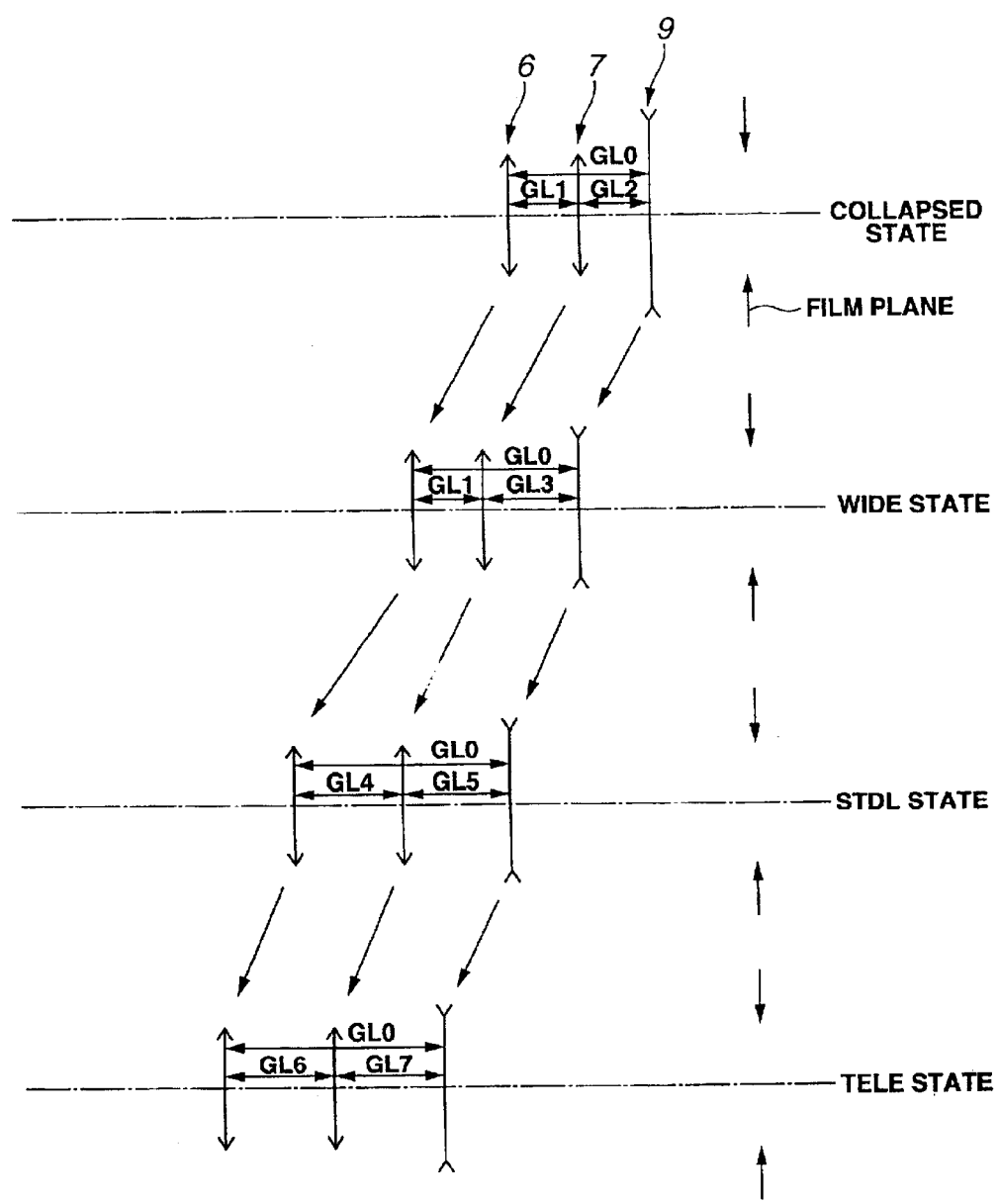
FIG. 8 is a diagram schematically showing the relation between distances of lens groups traveled by zooming in a zoom lens barrel according to a second embodiment of the present invention.
Figure 9A:
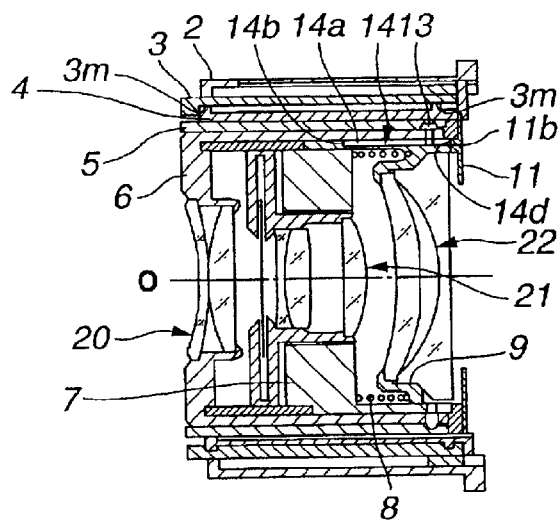
FIG. 9A is a sectional view of the configuration of the zoom lens barrel according to the second embodiment in a collapsed state.
Figure 9B:
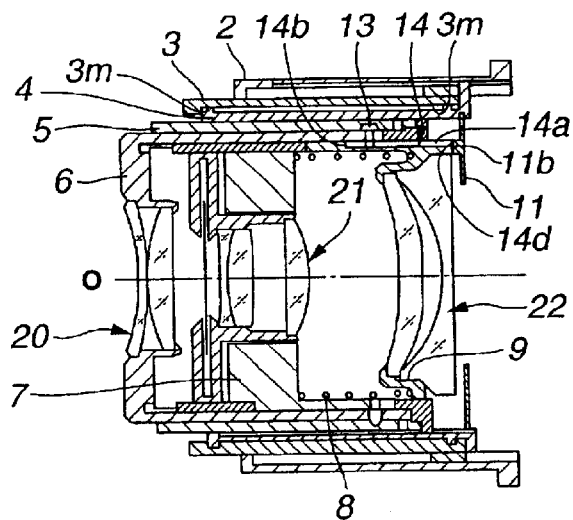
FIG. 9B is a sectional view of the configuration of the zoom lens barrel according to the second embodiment in a wide angle state.
Figure 9C:
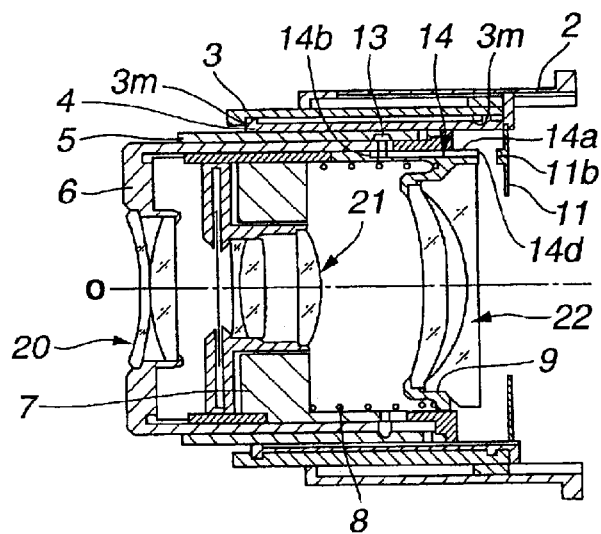
FIG. 9C is a sectional view of the configuration of the zoom lens barrel according to the second embodiment in a telephoto state.

FIGS. 8, 9A, 9B, and 9C show a zoom lens barrel according to a second embodiment of the present invention. FIG. 9A shows a collapsed state of the present zoom lens barrel. FIG. 9B shows a wide angle state of the zoom lens barrel. FIG. 9C shows a state of the zoom lens barrel from a standard position to a telephoto position.

In FIGS. 8, 9A, 9B, and 9C, the same components as those of the zoom lens barrel according to the first embodiment are designated by the same reference numerals and the description is omitted. Only different portions will be described.

In the zoom lens barrel according to the first embodiment, the first lens frame 6 and the third lens frame 9 are advanced together with a predetermined space therebetween from the wide-angle end position to the telephoto position. In the present zoom lens barrel according to the present embodiment, the operation of advancing the first lens frame 6 and the third lens frame 9 in a zooming area (photographable area) can also be changed.

The configuration of the present zoom lens barrel is substantially the same as that according to the first embodiment. As shown in FIGS. 9A, 9B, and 9C, thrust portions 11b protruding so as to have a predetermined size on the object side are formed in predetermined portions of the flare diaphragm 11, the predetermined portions being come into contact with the contact portions 14d (extensions 14) of the third lens frame 9. The predetermined size of each thrust portion 11b is set so that, for example, the contact portion 14d is in contact with the thrust portion 11b from the collapsing mode to the wide angle mode (wide-angle end position) of the present zoom lens barrel.

In the zoom lens barrel according to the present embodiment, as shown in FIG. 8, a standard state (referred to as a STD state in the diagram) serving as the photographable area is set between the wide angle state (wide-angle end position) and the telephoto state (telephoto end position). The first lens frame 6 and the third lens frame 9 are advanced together with a predetermined space therebetween from the standard state to the telephoto state.

In other words, according to the second embodiment, when the present zoom lens barrel 1 is collapsed, as shown in FIG. 8, the first lens frame 6 and the third lens frame 9 are received in the stationary frame 2 with a predetermined space therebetween in a manner similar to the foregoing first embodiment. In this case, the third lens frame 9 is retracted until each contact portion 14d of each extension 14 of the third lens frame 9 is come into contact with each thrust portion 11b of the flare diaphragm 11 (refer to FIG. 9A). That is, positioning of the third lens frame 9 with respect to the film plane is achieved by the thrust portion 11b. At this time, the space GL0 between the first lens frame 6 and the third lens frame 9 is remarkably reduced smaller than the conventional one in the same case as in the foregoing first embodiment.

When the present zoom lens barrel 1 is advanced from the collapsing position to the wide-angle end position (wide angle state), as shown in FIG. 8, the first lens frame 6, the second lens frame 7, and the third lens frame 9 are advanced relative to each other so that the space between the first lens frame 6 and the third lens frame 9 is widened.

In this case, according to the second embodiment, as shown in FIG. 9B, when the lens frames are advanced in the state where each contact portion 14d of the third lens frame 9 is thrust by each thrust portion 11b of the flare diaphragm 11, each first pin 13 of the first lens frame 6 is moved in the first sliding groove 14a formed on each extension 14 of the third lens frame 9. Thus, the space between the first lens frame 6 and the third lens frame 9 is widened to the predetermined space GL0.

After that, when the present zoom lens barrel 1 is advanced from the wide-angle end position to the standard position serving as the photographable area, as shown in FIG. 8, the space GL0 between the first lens frame 6 and the third lens frame 9 is widened. Simultaneously, the second lens frame 7 and the third lens frame 9 are advanced relative to each other.

In other words, the space GL4 between the first lens frame 6 and the second lens frame 7 is wider than that in the wide angle position and the space GL5 between the second lens frame 7 and the third lens frame 9 is also wider than that in the wide angle position.

When the present zoom lens barrel 1 is advanced from the standard position serving as the photographable area to the telephoto end position (telephoto state), as shown in FIG. 8, the first lens frame 6, the second lens frame 7, and the third lens frame 9 are advanced relative to each other so that the space GL0 between the first lens frame 6 and the third lens frame 9 is not changed but only the space between the first lens frame 6 and the second lens frame 7 is widened.

In other words, a space GL6 between the first lens frame 6 and the second lens frame 7 at the telephoto position is wider than the space GL4 at the standard position and a space GL7 between the second lens frame 7 and the third lens frame 9 is narrower than the space GL5 at the standard position.

In such an area where the first lens frame 6 and the third lens frame 9 are advanced with a predetermined space therebetween, as shown in FIG. 9C, each first pin 13 of the first lens frame 6 is come into contact with the positioning portion of each first sliding groove 14a of the third lens frame 9 by the pushing force of the spring 8 in the same way as in the first embodiment.

According to the present second embodiment, therefore, the operation of advancing the first lens frame 6 and the third lens frame 9 can be changed during the zooming operation. Thus, flexibility in optical design of a camera having a zoom lens barrel can be increased. Other advantages are similar to those of the foregoing first embodiment.

The present invention is not limited to the above embodiments but many modifications and variations of the embodiments may be made in the present invention.

As described above, according to the present invention, the first lens frame and the third lens frame can be precisely positioned with a simple configuration, and it is possible to provide a zoom lens barrel which can be compact in size and whose manufacturing process can be simplified and whose manufacturing cost can be reduced.

It should be apparent that working modes different in a wide range can be formed on the basis of this invention without departing from the spirit and scope of the invention. This invention is not restricted by any specific embodiment except as limited by the appended claims.

What is claimed is:

1. A lens barrel comprising:

a first lens group;

a first frame member supporting the first lens group;

a second lens group;

a second frame member supporting the second lens group, the second frame member being movable forward and backward relative to the first frame member along an optical axis;

a cam follower provided for the first frame member;

a cam frame member having a cam groove which is engaged with the cam follower to drive the first frame member forward and backward in a direction of the optical axis;

a contact portion formed on the second frame member, the contact portion being capable of coming into contact with the cam follower in the direction of the optical axis; and a pushing member for pushing the second frame member in a direction in which the cam follower comes into contact with the contact portion, wherein when the second frame member is pushed by the pushing member, the contact portion comes into contact with the cam follower to restrict a position of the second lens group with respect to the first lens group.

2. A lens barrel according to claim 1, wherein:

the cam follower comprises a cam follower segment which is engaged with the cam groove and a positioning portion which the contact portion comes into contact with, and the cam follower is selected from cam followers including positioning portions having different outer diameters and is then attached, so that a distance between the first lens group and the second lens group can be adjusted.

3. A lens barrel according to claim 1, wherein:

at least three cam followers and at least three cam grooves are formed in a circumferential direction, each cam follower comprises a cam follower segment which is engaged with each cam groove and a positioning portion which the contact portion comes into contact with, and the cam followers are selected from cam followers including positioning portions having different outer diameters and are then attached in the circumferential direction, so that a tilt of the second lens group with respect to the first lens group can be adjusted.

4. A lens barrel according to claim 1, wherein:

the cam follower is arranged so as to perforate an annular portion of the first frame member;

the cam follower comprises a cam follower segment which is engaged with the cam groove and a positioning portion which the contact portion comes into contact with, and the cam follower segment and the positioning portion are arranged outside and inside of the annular portion of the first frame member, respectively.

5. A lens barrel according to claim 4, wherein:

the second frame member is disposed in the first frame member and the contact portion is arranged so as to protrude toward an inner surface of the first frame member.

6. A zoom lens barrel comprising:

a first lens group;

a first frame member supporting the first lens group and including a cam follower;

a cam frame member having a cam groove which is engaged with the cam follower to drive the first frame member forward and backward in a direction of an optical axis;

a second lens group;

a second frame member supporting the second lens group, the second frame member being movable relative to the first frame member along the optical axis;

a contact portion formed on the second frame member, the contact portion being capable of coming into contact with the cam follower;

a pushing member for pushing the first frame member away from the second frame member; and a thrust member for thrusting the second frame member toward the first frame member against the pushing member when the zoom lens barrel is in a non-photographic mode, wherein when the zoom lens barrel is in a photographic mode, the second frame member is pushed by the pushing member and the contact portion comes into contact with the cam follower, so that a space between the first lens group and the second lens group is kept constant, and when the zoom lens barrel is in the non-photographic mode, the second frame member is thrust by the thrust member and the contact between the contact portion and the cam follower is released, so that the space between the first lens group and the second lens group is narrower than in the photographic mode.

7. A zoom lens barrel according to claim 6, wherein the cam follower comprises:

a cam follower segment which is engaged with the cam groove and which is rotationally symmetrical about a direction which is perpendicular to the optical axis and which serves as a central axis, a positioning portion which the contact portion can come into contact with and which is rotationally symmetrical about an eccentric axis with respect to the central axis, and the cam follower is rotatable around the central axis, so that a distance between the first lens group and the second lens group can be adjusted.

8. A zoom lens barrel according to claim 7, wherein:

at least three cam followers and at least three cam grooves are arranged in a circumferential direction, and each cam follower is rotatable around the central axis, so that a tilt of the second lens group with respect to the first lens group can be adjusted.

9. A zoom lens barrel according to claim 6, wherein:

the cam follower is arranged so as to perforate an annular portion of the first frame member;

the cam follower comprises a cam follower segment which is engaged with the cam groove and a positioning portion which the contact portion comes into contact with, and the cam follower segment and the positioning portion are arranged outside and inside of the annular portion of the first frame member, respectively.

10. A zoom lens barrel according to claim 9, wherein:

the second frame member is disposed in the first frame member and the contact portion is arranged so as to protrude toward an inner surface of the first frame member.

11. A zoom lens barrel comprising:

a first lens group;

a first frame member supporting the first lens group;

a second lens group;

a second frame member supporting the second lens group, the second frame member being movable relative to the first frame member along an optical axis;

a cam follower provided for the first frame member;

a cam frame member having a cam groove which is engaged with the cam follower to drive the first frame member forward and backward in a direction of the optical axis;

a contact portion provided for the second frame member, the contact portion being capable of coming into contact with the cam follower;

a pushing member for pushing the second frame member in a direction in which the cam follower comes into contact with the contact portion; and separating means for displacing the second frame member upon collapsing in a direction in which the cam follower is separated from the contact portion, wherein upon zooming, the cam follower comes into contact with the contact portion to keep a space between the first lens group and the second lens group constant, and upon collapsing, the cam follower is separated from the contact portion by the separating means to reduce the space between the first lens group and the second lens group.

12. A zoom lens barrel according to claim 11, wherein the cam follower comprises:
   a cam follower segment which is engaged with the cam groove and which is rotationally symmetrical about a direction which is perpendicular to the optical axis and which serves as a central axis,
   a positioning portion which the contact portion can come into contact with and which is rotationally symmetrical about an eccentric axis with respect to the central axis, and
   the cam follower is rotatable around the central axis, so that a distance between the first lens group and the second lens group can be adjusted.

13. A zoom lens barrel according to claim 12, wherein:
   at least three cam followers and at least three cam grooves are provided in a circumferential direction, and
   each cam follower is rotatable around the central axis, so that a tilt of the second lens group with respect to the first lens group can be adjusted.

14. A zoom lens barrel according to claim 11, wherein:
   the cam follower is arranged so as to perforate an annular portion of the first frame member;
   the cam follower comprises a cam follower segment which is engaged with the cam groove and a positioning portion which the contact portion comes into contact with, and
   the cam follower segment and the positioning portion are arranged outside and inside of the annular portion of the first frame member, respectively.

15. A zoom lens barrel according to claim 14, wherein:
   the second frame member is disposed in the first frame member and the contact portion is arranged so as to protrude toward an inner surface of the first frame member.

16. A lens barrel comprising:
a first frame member;
a second frame member which can advance and retract relative to the first frame member along an optical axis;
a cam follower provided for the first frame member;
a cam frame member having a cam groove which is engaged with the cam follower to drive the first frame member along in a direction of the optical axis;
a contact portion provided for the second frame member, the contact portion being capable of coming into contact with the cam follower along the optical axis; and
a pushing member for pushing the second frame member in a direction in which the cam follower comes into contact with the contact portion,
wherein when the second frame member is pushed by the pushing member, the contact portion comes into contact with the cam follower to restrict a position of the second frame member with respect to the first frame member along the optical axis.

17. A lens barrel according to claim 16, wherein:
the cam follower is arranged so as to perforate an annular portion of the first frame member;
the cam follower comprises a cam follower segment which is engaged with the cam groove and a positioning portion which the contact portion comes into contact with, and
the cam follower segment and the positioning portion are arranged outside and inside of the annular portion of the first frame member, respectively.

18. A lens barrel according to claim 17, wherein:
the second frame member is disposed in the first frame member and the contact portion is arranged so as to protrude toward an inner surface of the first frame member.

* * * * *